United States Patent
Wang

(10) Patent No.: US 8,963,374 B2
(45) Date of Patent: Feb. 24, 2015

(54) SYSTEM AND METHOD FOR INTEGRATING WIND POWER GENERATION WITH WAVE POWER GENERATION

(75) Inventor: Li Wang, Kaohsiung (TW)

(73) Assignee: National Cheng Kung University (TW)

( * ) Notice: Subject to any disclaimer, the term of this patent is extended or adjusted under 35 U.S.C. 154(b) by 562 days.

(21) Appl. No.: 13/313,346

(22) Filed: Dec. 7, 2011

(65) Prior Publication Data

US 2012/0139351 A1    Jun. 7, 2012

(30) Foreign Application Priority Data

Dec. 7, 2010   (TW) ............................... 99142692 A

(51) Int. Cl.
| | |
|---|---|
| H02J 1/00 | (2006.01) |
| H02J 3/00 | (2006.01) |
| H02J 3/38 | (2006.01) |
| H02J 3/36 | (2006.01) |

(52) U.S. Cl.
CPC .................. *H02J 3/386* (2013.01); *H02J 3/383* (2013.01); *H02J 3/382* (2013.01); *H02J 3/36* (2013.01); *Y02E 10/38* (2013.01); *Y02E 10/763* (2013.01); *Y02E 60/60* (2013.01); *Y02E 10/563* (2013.01)
USPC ................... 307/81; 307/80; 307/43; 307/86; 307/77; 290/44; 290/53

(58) Field of Classification Search
USPC .......... 307/82, 43, 58, 64, 65, 71, 77; 290/44, 290/53; 60/504
See application file for complete search history.

(56) References Cited

U.S. PATENT DOCUMENTS

| | | | | |
|---|---|---|---|---|
| 4,035,659 | A | * | 7/1977 | Jeppson .......................... 307/84 |
| 8,441,139 | B2 | * | 5/2013 | Karimi ............................ 290/53 |
| 2004/0026929 | A1 | * | 2/2004 | Rebsdorf et al. ................ 290/44 |
| 2004/0061380 | A1 | * | 4/2004 | Hann et al. ...................... 307/43 |
| 2010/0122529 | A1 | * | 5/2010 | Kroll .............................. 60/504 |
| 2011/0095612 | A1 | * | 4/2011 | Kirkpatrick .................... 307/77 |

FOREIGN PATENT DOCUMENTS

TW      M281076      11/2005

OTHER PUBLICATIONS

Cimuca et al., Design and Control Strategies of an Induction-Machine-Based Flywheel Energy Storage System Associated to a Variable-Speed Wind Generator, IEEE Transactions on Energy Conversion, Jun. 2010, pp. 526-534, vol. 25, No. 2.
Xu et al., Grid Integration of Large DFIG-Based Wind Farms Using VSC Transmission, IEEE Transactions on Power Systems, Aug. 2007, pp. 976-984, vol. 22, No. 3.
Feltes et al., Enhanced Fault Ride—Through Method for Wind Farms Connected to the Grid Through VSC-Based HVDC Transmission, IEEE Transactions on Power Systems, Aug. 2009, pp. 1537-1546, vol. 24, No. 3.

(Continued)

*Primary Examiner* — Rexford Barnie
*Assistant Examiner* — Jagdeep Dhillon
(74) *Attorney, Agent, or Firm* — Volpe and Koenig, P.C.

(57) ABSTRACT

A system for integrating a wind power generation with a wave power generation includes a wind power generation device, a wave power generation device and a power integration device. The wind power generation device generates a first voltage. The wave power generation device generates a second voltage. The power integration device integrates the first voltage with the second voltage.

13 Claims, 10 Drawing Sheets

(56) References Cited

OTHER PUBLICATIONS

Prabhu et al., Investigation of Subsynchronous Resonance With VSC-Based HVDC Transmission Systems, IEEE Transactions on Power Delivery, Jan. 2009, pp. 433-440, vol. 24, No. 1.

Muyeen et al., Operation and Control of HVDC-Connected Offshore Wind Farm, IEEE Transactions on Sustainable Energy, Apr. 2010, pp. 30-37, vol. 1, No. 1.

Wang et al., Dynamic Stability Enhancement and Power Flow Control of a Hybrid Wind and Marine-Current Farm Using SMES, IEEE Transactions on Energy Conversion, Sep. 2009, pp. 626-639, vol. 24, No. 3.

Thelen et al, A 2-MW Motor And ARCP Drive for High-Speed Flywheel, IEEE 1-4244-0714-1/07, 2007, pp. 1690-1694, Center for Electromechanics, The University of Texas at Austin, Austin, TX 78712 USA.

Wang et al., Stability Analysis of a Wave-Energy Conversion System Containing a Grid-Connceted Induction Generator Driven by a Wells Turbine, IEEE Transactions on Energy Conversion, Jun. 2010, pp. 555-563, vol. 25, No. 2.

Merkhouf et al., Variable Frequency Transformer Electromagnetic Design Concept, IEEE 1-4244-1298-6/07, 2007, pp. 1-6, GE Energy, Peterborough, Ontario, Canada.

Truman et al., A Direct Current Torque Motor for Application on a Variable Frequency Transformer, IEEE 1-4244-1298-6/07, 2007, pp. 1-5.

Markin et al., VFT—A Smart Transmission Technology That Is Compatible With the Existing and Future Grid, IEEE 978-1-4244-3811-2/09, 2009, pp. 1-7.

Li et al., Power System Stability Enhancement by a Double-fed Induction Machine with a Flywheel Energy Storage System, IEEE 1-4244-0493-2/06, 2006, 7 pages.

De Andrade, Jr. et al., Flywheel Energy Storage System Description and Tests, IEEE Transactions on Applied Superconductivity, Jun. 2007, pp. 2154-2157, vol. 17, No. 2.

Hughes et al., Control of DFIG-Based Wind Generation for Power Network Support, IEEE Transactions on Power Systems, Nov. 2005, pp. 1958-1966, vol. 20, No. 4.

Wu et al., Small signal stability analysis and optimal control of a wind turbine with doubly fed induction generator, IET Gener. Transm. Distrib., 2007, pp. 751-760, The Institution of Engineering and Technology 2007.

Kayikçi et al., Reactive Power Control Strategies for DFIG-Based Plants, IEEE Transactions on Energy Conversion, Jun. 2007, pp. 389-396, vol. 22, No. 2.

Narayanan et al., Dynamic Analysis of a Grid-Connected Induction Generator Driven by a Wave-Energy Turbine through Hunting Networks, 0-7803-2795-0, pp. 445-451, Department of Electrical Engineering, India Institute of Technology, Madras 600036, India.

Rao et al., Control of Induction Generator in a Wells Turbine Based Wave Energy System, IEEE PEDS 0-7803-9296-5/05, 2005, pp. 1590-1594.

Murthy et al., Rotor Side Control of Wells Turbine Driven Variable Speed Constant Frequency Induction Generator, EMP 33(6) #39080, Electric Power Components and Systems, 33:587-596, 2005, pp. 587-596, Copyright Taylor & Francis, inc., ISSN: 1532-5008.

\* cited by examiner

Fig. 1 (Proir art)

SYSTEM AND METHOD FOR INTEGRATING WIND POWER GENERATION WITH WAVE POWER GENERATION

CROSS-REFERENCES TO RELATED APPLICATIONS

This application claims the benefit of Taiwan Patent Application No. 099142692, filed on Dec. 7, 2010, in the Taiwan Intellectual Property Office, the disclosures of which are incorporated herein in their entirety by reference.

FIELD OF THE INVENTION

The present invention relates to a system and method for integrating a wind power generation with a wave power generation, and more particularly to a system and method for integrating a wind power generation with a wave power generation by using an offshore wind farm.

BACKGROUND OF THE INVENTION

In recent years, the price of the petrochemical fuel is rising, and the power generation from the petrochemical fuel will result in the greenhouse effect and ruin the ecology and the environment. Therefore, a variety of countries one after another seek the alternative energy sources without ruining the environment of the earth. The regenerative energy source is undoubtedly one of the best choices in the alternative energy sources. For instance, the regenerative energy source includes the wind energy, the solar energy, the ocean energy, the hydraulic energy, and so forth. The ocean energy includes types of the tidal energy, the wave energy, the electrical energy of the temperature difference, the offshore wind energy, and so forth.

In recent years, employing the offshore wind farm becomes the new development trend in the field of the wind power generation. The wind power generation system having this type includes a wind tower, which is constructed on the seabed or on the buoyancy foundation support. The wind power generation system utilizes the steady wind energy on the sea to generate the electrical power. The wind tower occupies no land. Therefore, a plurality of wind power generators established at sea can form an offshore wind farm. The power generated by the offshore wind farm should be transmitted to the shore through a step-up transformer and a submarine cable for a further use.

Hughes et al disclose that a doubly-fed induction generator with a configured wind farm has a property similar to that of a synchronous generator, and has the ability to keep a system frequency. Wu et al use a particle swarm optimization to analyze a controller parameter of a doubly-fed induction generator so as to accomplish an optimum scheduling of a power generation system by an optimized controller parameter. Kayıkçı et al disclose that a reactive power of a doubly-fed induction generator is controlled to improve the output power quality of the doubly-fed induction generator and increase the stability thereof. Narayanan et al extend a hunting-network method to an induction generator mode to combine a Wells turbine with an induction generator.

Rao et al introduce a wave power generation system employing a Wells turbine. Murthy et al uses the Matlab/Simulink software to simulate an induction generator set driven by a Wells turbine so as to obtain a property of a higher output power. Wang et al accomplish a dynamic simulation and a dynamic stability analysis of a steady-state performance of a wave power generation system, and disclose that stator windings of an induction generator are connected to a power network through a step-up transformer and a transmission line. Merkhouf et al introduce a design concept of a variable frequency transformer, and disclose that a high-voltage DC transmission system can be replaced with the variable frequency transformer for controlling a power flow. Truman et al disclose a property of a DC driving motor that a variable frequency transformer needs using. Marken et al disclose that variable frequency transformers are respectively added into a plurality of different systems, and research the possibility that a variable frequency transformer is added to a current or future power network. Li et al use a variable-speed flywheel to serve as a multifunction flexible power conditioner, which has a better compensation effect. Andrade et al provide a configuration of a flywheel energy-storage system, and test a compensation effect resulting from a load variation when a flywheel energy-storage system is connected to a commercial electric supply. Thelen et al use a high-speed induction motor and a switching converter to serve as a transmission interface unit between a flywheel and a mixed power system. Gimuca et al provide a direct torque control method to control a flywheel energy-storage system having a dominant component of an induction machine, and match the flywheel energy-storage system with a variable-speed wind turbine generator to make a simulation.

Feltes et al disclose that: a voltage source converter and a high-voltage DC transmission system are applied to a wind farm, and the high-voltage DC transmission system is connected with a power network in parallel; and when the high-voltage power network has a fault, a control method is used to further stabilize the system.

Prabhua et al disclose that a high-voltage DC transmission system associated with a voltage source converter is connected to a power network, and an eigenvalue analysis in the frequency domain and a dynamic simulation analysis in the time domain are accomplished.

Muyeen et al use the PSCAD/EMTDC software to simulate an offshore wind farm formed by a permanent-magnet synchronous generator driven by a variable-speed wind turbine. Wang et al disclose a superconducting-magnetic energy-storage system having a control structure, the control structure is connected to a commercial electric supply, and the system is connected to a parallel offshore wind farm, thereby accomplishing a power flow control and improving a system damping control.

Please refer to FIG. 1, which is a schematic diagram showing a conventional wind power generator. In the Taiwanese issued utility model patent with No. M281076, an offshore wind power generation device 10 on the sea is provided. The offshore wind power generation device 10 includes a floating plate 11 and a wind power generator 12. The floating plate 11 can cause the offshore wind power generation device 10 to be positioned and float on the water. The wind power generator 12 is fixed on the floating plate 11, so that the natural wind force blows to move the blades 121 of the wind power generator 12 and causes the power generation unit inside the wind power generator 12 to be able to generate a power for supply.

The wave power generation is one of important develops in the ocean energy research, and utilizes a wave energy to generate an electrical power. The wave energy is converted into electrical power through a specific power generation device. The electrical power is transmitted through a step-up transformer and a submarine cable for a further use. The Wells turbine belongs to a type of a wave power generation device, and the blades of the Wells turbine are specifically designed, so that the blades are rotated in a single direction no matter the wave moves forward or backward.

Whether the wave power generation or the wind power generation is implemented, the power transmission, the power integration and the power control are necessary. Furthermore, there is the demand to provide a system for integrating a wind power generation with a wave power generation.

SUMMARY OF THE INVENTION

It is an object of the present invention to provide a system and method for integrating a wind power generation with a wave power generation. The system integrates two types of power generation systems to generate a power higher than that generated by a single type of power generation system so as to provide a sufficient power to the user terminal.

It is an embodiment of the present invention to provide a system for integrating a wind power generation with a wave power generation. The system includes a wind power generation device, a wave power generation device and a power integration device. The wind power generation device generates a first voltage. The wave power generation device generates a second voltage. The power integration device integrates the first voltage with the second voltage.

It is another embodiment of the present invention to provide a method for integrating a wind power generation with a wave power generation. The method includes the following steps. A first voltage from the wind power generation and a second voltage from the wave power generation are generated. In addition, the first voltage is integrated with the second voltage.

It is still another embodiment of the present invention to provide an integrated power generation system. The system includes a first power generation device, a second power generation device and a power-generation integration device. The first power generation device has a first power generation type. The second power generation device has a second power generation type different from the first power generation type. The power-generation integration device integrates the first power generation device with the second power generation device.

BRIEF DESCRIPTION OF THE DRAWINGS

The foregoing and other features and advantages of the present invention will be more clearly understood through the following descriptions with reference to the drawings, wherein.

DETAIL DESCRIPTION OF THE PREFERRED EMBODIMENT

Figure 1:
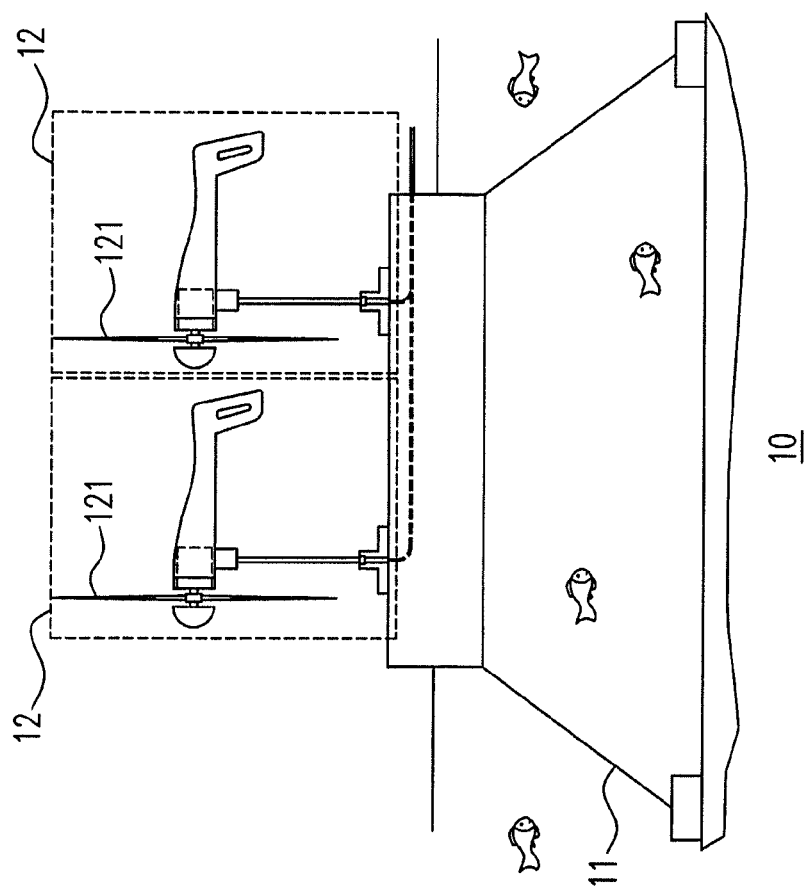
FIG. 1 is a schematic diagram showing a conventional wind power generator.

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

The present invention involves the green energy sources that a variety of countries vigorously develop. It is suitable that the developed green energy sources should mainly meet the conditions of a country. The geographical conditions in Taiwan have the northeast monsoon for half a year in the autumn and the winter, and further have the southwest monsoon in the summer. In addition to the solar energy and the hydraulic energy, such island as Taiwan further has the very rich wave energy capable of being combined with the offshore wind energy, so that embodiments about a system and method for integrating a wind power generation with a wave power generation are provided.

In one embodiment of the present invention, a system for integrating a wind power generation with a wave power generation is formed to be an integrated set. When the external environment changes to be in the season that the generated wind power is insufficient, there is the wave power generation capable of remedying the shortage of the electrical power. Under this condition, the integrated power generation system cannot go so far as to form a single type of a power generation system, and can avoid the regret resulting from the shortage of the economic effect due to the uncertain factors of the external environment.

In embodiments of the present invention, a gathered equivalent offshore wind farm, a gathered equivalent coastwise wave farm, a variable frequency transformer, a flywheel energy-storage system and a high-voltage DC transmission system are established, and three system configurations are formed by using the gathered equivalent offshore wind farm, the gathered equivalent coastwise wave farm, the variable frequency transformer, the flywheel energy-storage system and the high-voltage DC transmission system. For instance, the first system configuration of the three system configurations integrates an offshore wind farm with a coastwise wave farm, includes a variable frequency transformer, and is connected with a commercial electric supply system in parallel. For instance, the second system configuration of the three system configurations integrates an offshore wind farm with a coastwise wave farm, includes a flywheel energy-storage system, and is connected with a commercial electric supply system in parallel. For instance, the third system configuration of the three system configurations integrates an offshore wind farm with a coastwise wave farm, includes a high-voltage DC transmission system, and is connected with a commercial electric supply system in parallel.

In embodiments of the present invention, steady state analyses corresponding to the three system configurations are established. Each of the steady state analysis includes a steady-state operating point analysis and an eigenvalue analysis under different conditions. The steady-state operating point analysis is used to decide whether the corresponding system can operate in a predetermined normal range under a variety of conditions. The eigenvalue analysis is used to decide whether the corresponding system can still keep stable when the corresponding system has a disturbance.

In embodiments of the present invention, dynamic analyses corresponding to the three system configurations are established. Each of the dynamic analysis includes a decision about whether the corresponding system can still keep normally operating when the corresponding system receives a variety of disturbances. The three system configurations includes system controller, respectively. Regarding the designs of the system controllers, each of the three system configurations employs the proportional-integral-derivative (PID) controller common in the industrial-process control for improving the damping of the system modes. When the corresponding system suffers a disturbance, the corresponding PID controller in the corresponding system can speed up the corresponding system to recover to be stable and reduce the oscillation amplitude generated due to the disturbance. From the data shown in Table 1, Table 2 and Table 3 in the bottom portion of embodiments of the present invention, it can be been seen that the system and method for integrating a wind power generation with a wave power generation is suitable in the industrial implementation.

Figure 2:
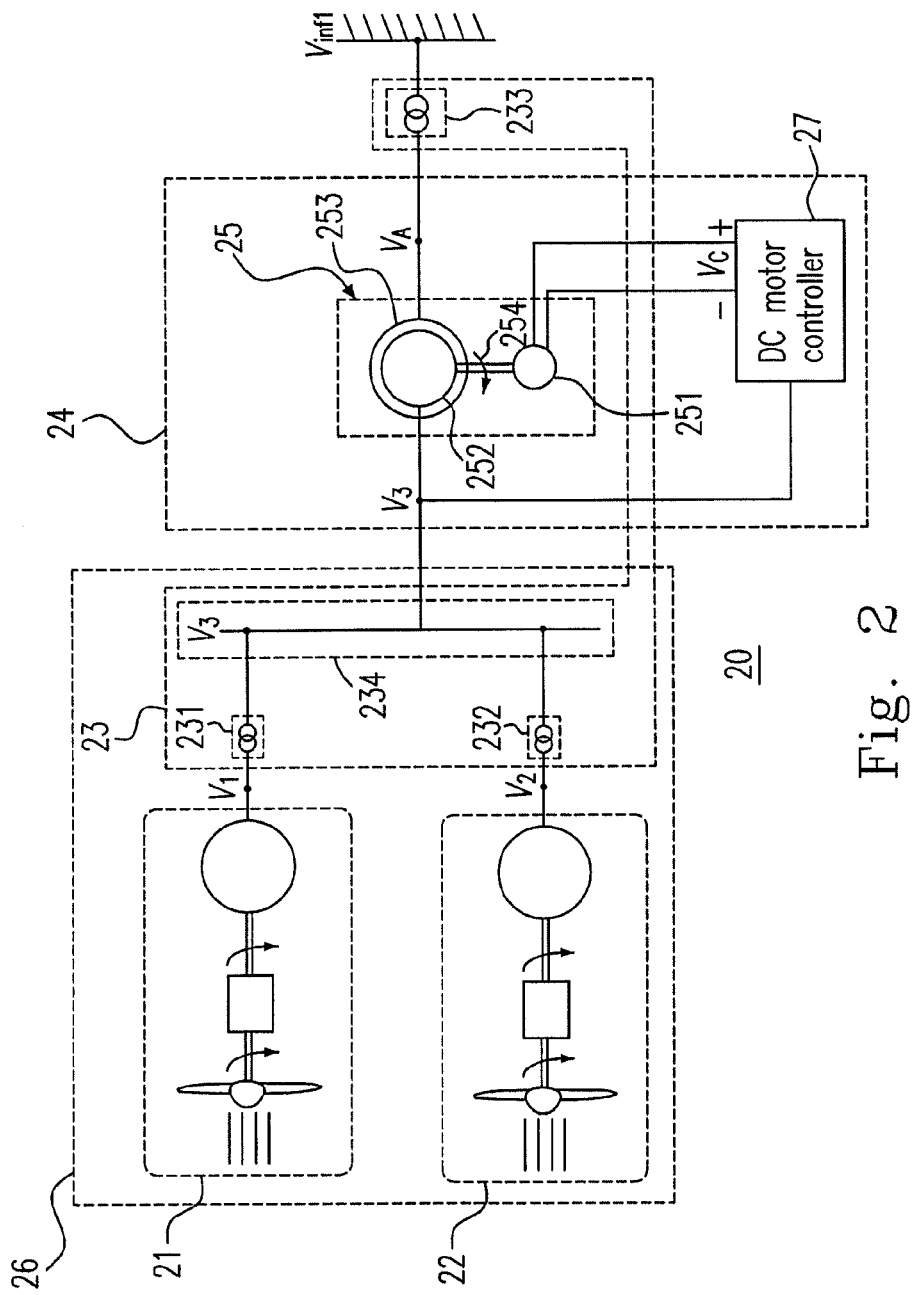
FIG. 2 is a schematic diagram showing a system for integrating a wind power generation with a wave power generation according to the first embodiment of the present invention.

Please refer to FIG. 2, which is a schematic diagram showing a system 20 for integrating a wind power generation with a wave power generation according to the first embodiment of the present invention. As shown, the system 20 for integrating the wind power generation with the wave power generation includes a wind power generation device 21, a wave power generation device 22 and a power integration device 23. The wind power generation device 21 generates a first voltage $V_1$. The wave power generation device 22 generates a second voltage $V_2$. The power integration device 23 integrates the first voltage $V_1$ with the second voltage $V_2$. For instance, the first voltage $V_1$ is integrated with the second voltage $V_2$ for a further use. The wind power generation device 21 includes a doubly-fed induction generator. The wave power generation device 22 includes one selected from a group consisting of a squirrel cage rotor induction generator, a Wells turbine and a double-side pipe permanent-magnet system. The power integration device 23 may be a power-generation integration device.

The power integration device 23 includes a first step-up device 231, a second step-up device 232, a third step-up device 233 and a bus 234. Each of the first step-up device 231 and the second step-up device 232 is connected to the bus 234. The first step-up device 231 boosts the first voltage $V_1$ up to a third voltage $V_3$. The second step-up device 232 boosts the second voltage $V_2$ up to the third voltage $V_3$. The system 20 further includes a voltage stabilizing system 24. The voltage stabilizing system 24 is connected to the third step-up device 233, controls the third voltage $V_3$ to derive a fourth voltage $V_A$ from the third voltage $V_3$, and stabilizes the third voltage $V_3$. The third step-up device 233 boosts the fourth voltage $V_A$ up to the voltage $V_{infl}$. For instance, each of the first step-up device 231, the second step-up device 232 and the third step-up device 233 is a respective step-up transformer.

The wind power generation device 21 and the wave power generation device 22 generate a power of 100 MW (mega Watts) and a power of 60 MW, respectively. The wind power generation device 21 and the wave power generation device 22 generate a first AC (alternating-current) voltage of 0.69 kV (kilo Volts) and a second AC voltage of 0.69 kV, respectively. The first step-up device 231 boosts the first AC voltage of 0.69 kV up to an AC voltage of 23 kV provided to the bus 234, and the second step-up device 232 boosts the second AC voltage of 0.69 kV up to the AC voltage of 23 kV. That is to say, a first power generated by the wind power generation device 21 and a second power generated by the wave power generation device 22 converge in the bus 234 to form a third power, wherein the first, the second and the third powers have the first, the second and the third voltages $V_1$, $V_2$, and $V_3$, respectively. The voltage stabilizing system 24 includes a variable frequency transformer 25 and a DC (direct-current) motor controller 27 coupled to the variable frequency transformer 25. The variable frequency transformer 25 is connected to the third step-up device 233, and stabilizes the third voltage $V_3$ (i.e. the AC voltage of 23 kV). For instance, the variable frequency transformer 25 adjusts the third power to stabilize the third voltage $V_3$. The third step-up device 233 boosts the AC voltage of 23 kV up to an AC voltage of 161 kV for providing the voltage $V_{infl}$ of the commercial electric supply.

In one embodiment provided according to FIG. 2, the system 20 includes a system 26 for integrating a wind power generation with a wave power generation. The system 26 includes the wind power generation device 21, the wave power generation device 22, the first step-up device 231, the second step-up device 232 and the bus 234. Especially in this embodiment, when the electrical appliances are located in places on the coast, the power transmission device(s) in the system 20, e.g. each of the third step-up device 233 and the voltage stabilizing system 24, can be omitted so as to reduce the power loss in the conversion process.

Please further refer to FIG. 2. The variable frequency transformer 25 includes a DC motor 251, a rotor 252 and a stator 253. The DC motor 251 generates a torque 254 applied to the rotor 252. The DC motor controller 27 detects the variation of the third voltage $V_3$ to modulate at least one of the sign and the size of a control voltage $V_C$ for adjusting at least one of the sign and the size of the torque 254. When the third voltage $V_3$ has a disturbance, the voltage stabilizing function of the third voltage $V_3$ can be accomplished according to a control of the torque 254. For instance, when the third voltage $V_3$ increases, the torque 254 generated by the DC motor 251 is applied to the rotor 252 in a direction opposite to the rotating direction of the rotor 252. When the third voltage $V_3$ decreases, the torque 254 generated by the DC motor 251 is applied to the rotor 252 in a direction the same as the rotating direction of the rotor 252. When the third voltage $V_3$ is kept unchanged, the DC motor 251 suppresses generating the torque 254. In one embodiment, when the third voltage $V_3$ increases, the torque 254 generated by the DC motor 251 is decreased to stabilize the third voltage $V_3$; when the third voltage $V_3$ decreases, the torque 254 generated by the DC motor 251 is increased to stabilize the third voltage $V_3$; and when the third voltage $V_3$ is kept unchanged, the torque 254 is also kept unchanged. In one embodiment, the variable frequency transformer 25 includes the DC motor 251, the rotor 252, the stator 253 and the DC motor controller 27. In one embodiment, the variable frequency transformer 25 includes the DC motor 251, the rotor 252 and the stator 253, and the DC motor controller 27 includes the DC motor controller 27. The variable frequency transformer 25 generates the fourth voltage $V_A$, and the DC motor 251 adjusts the torque 254 to stabilize the third voltage $V_3$ in response to the third voltage $V_3$.

Figure 3:
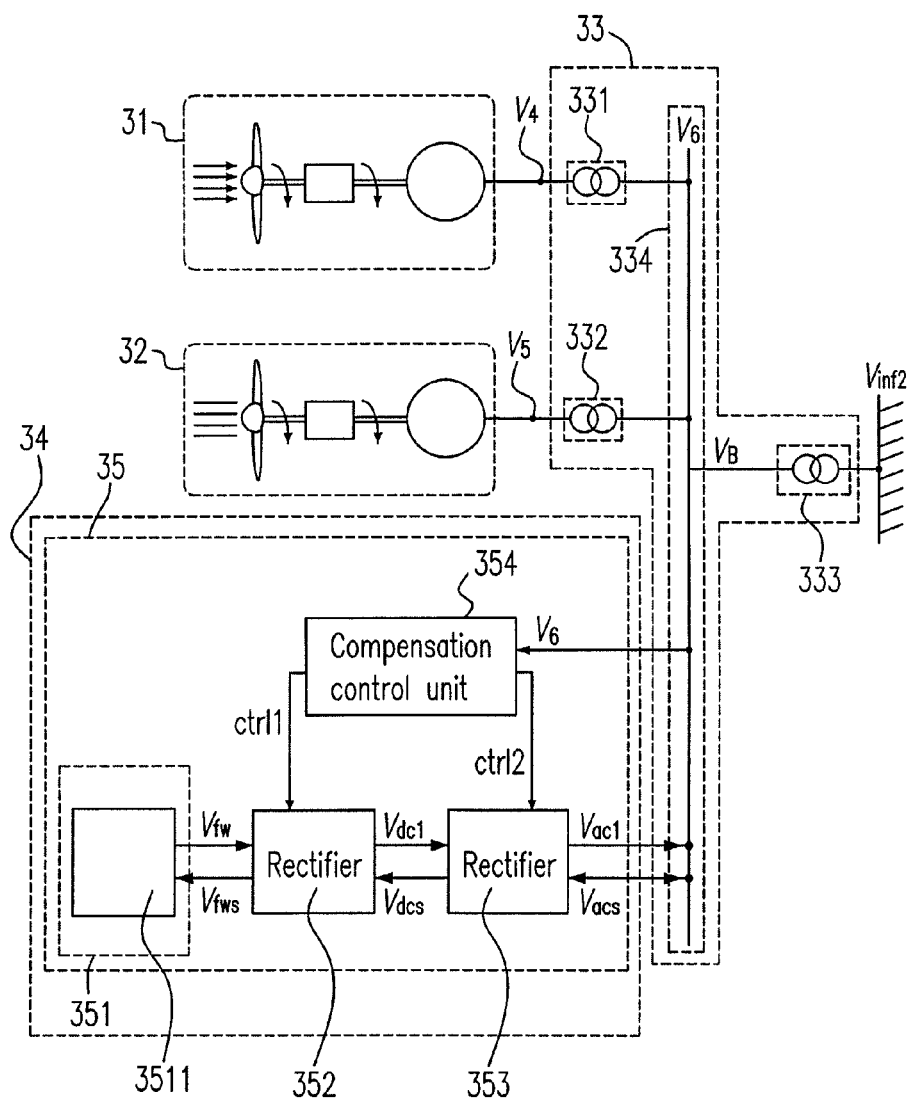
FIG. 3 is a schematic diagram showing a system for integrating a wind power generation with a wave power generation according to the second embodiment of the present invention.

Please refer to FIG. 3, which is a schematic diagram showing a system 30 for integrating a wind power generation with a wave power generation according to the second embodiment of the present invention. As shown, the system 30 for integrating the wind power generation with the wave power generation includes a wind power generation device 31, a wave power generation device 32 and a power integration device 33. The wind power generation device 31 generates a first voltage $V_4$. The wave power generation device 32 generates a second voltage $V_5$. The power integration device 33 integrates the first voltage $V_4$ with the second voltage $V_5$. For instance, the first voltage $V_4$ is integrated with the second voltage $V_5$ for a further use.

The power integration device 33 includes a first step-up device 331, a second step-up device 332, a third step-up device 333 and a bus 334. Each of the first step-up device 331 and the second step-up device 332 is connected to the bus 334. The first step-up device 331 boosts the first voltage $V_4$ up to a third voltage $V_6$. The second step-up device 332 boosts the second voltage $V_5$ up to the third voltage $V_6$. The system 30 further includes a voltage stabilizing system 34. The voltage stabilizing system 34 is connected to the third step-up device 333, controls the third voltage $V_6$ to derive a fourth voltage $V_B$ from the third voltage $V_6$, and stabilizes the third voltage $V_6$, wherein the third voltage $V_6$ is equal to the fourth voltage $V_B$. The third step-up device 333 boosts the fourth voltage $V_B$ up to the voltage $V_{inf2}$.

The wind power generation device 31 and the wave power generation device 32 generate a power of 100 MW (mega Watts) and a power of 60 MW, respectively. The wind power generation device 31 and the wave power generation device 32 generate a first AC (alternating-current) voltage of 0.69 kV (kilo Volts) and a second AC voltage of 0.69 kV, respectively. The first step-up device 331 boosts the first AC voltage of 0.69 kV up to an AC voltage of 23 kV provided to the bus 334, and the second step-up device 332 boosts the second AC voltage of 0.69 kV up to the AC voltage of 23 kV. That is to say, a first power generated by the wind power generation device 31 and a second power generated by the wave power generation device 32 converge in the bus 334 to form a third power, wherein the first, the second and the third powers have the first, the second and the third voltages $V_4$, $V_5$, and $V_6$, respectively. The voltage stabilizing system 34 includes a flywheel energy-storage system 35. The flywheel energy-storage system 35 is connected to the third step-up device 433, and stabilizes the third voltage $V_6$ (i.e. the AC voltage of 23 kV). For instance, the flywheel energy-storage system 35 adjusts the third power to stabilize the third voltage $V_6$. The third step-up device 333 boosts the AC voltage of 23 kV up to an AC voltage of 161 kV for providing the voltage $V_{inf2}$ of the commercial electric supply.

In FIG. 3, the flywheel energy-storage system 35 includes a flywheel electric machine 351, a rectifier 352, a rectifier 353 and a compensation control unit 354. For instance, the rectifier 352 is a flywheel side rectifier, and the rectifier 353 is a system side rectifier. The flywheel electric machine 351 includes an inertia-mass flywheel 3511. The inertia-mass flywheel 3511 stores a first energy having a kinetic-energy type by means of a high-speed rotation, wherein the first energy is converted from a second energy having an electrical-energy type, and the second energy is energized by the third power. The flywheel energy-storage system 35 causes the flywheel electric machine 351 to serve as an energy conversion device between an electrical energy and a kinetic energy. When an energy having the electrical-energy type in the flywheel electric machine 351 is converted into an energy having the kinetic-energy type, the flywheel electric machine 351 is in a motor mode, so that the rotating speed of the inertia-mass flywheel 3511 will increase, and the third power will be adjusted to stabilize the third voltage $V_6$. When an energy having the kinetic-energy type in the flywheel electric machine 351 is converted into an energy having the electrical-energy type, the flywheel electric machine 351 is in a generator mode and provides a converted electrical energy to the bus 334, so that the third power will be adjusted to stabilize the third voltage $V_6$. For instance, the flywheel energy-storage system 35 makes a reactive-power compensation of the third power to stabilize the third voltage $V_6$. For instance, the flywheel energy-storage system 35 adjusts a reactive power of the third power to stabilize the third voltage $V_6$. It is necessary to provide a voltage source to the flywheel electric machine 351 in the start stage for starting the flywheel electric machine 351, and then the flywheel electric machine 351 can provide an energy-storage function or a power-generation function.

In FIG. 3, the flywheel energy-storage system 35 stores a kinetic energy, and adjusts the kinetic energy to stabilize the third voltage $V_6$ in response to the third voltage $V_6$. The compensation control unit 354 detects the third voltage $V_6$ on the bus 334 for controlling the rectifiers 352 and 353. When the third voltage $V_6$ is lower than a reference voltage, the compensation control unit 354 utilizes a control signal ctrl1 to control the rectifier 352, so that the rectifier 352 converts an AC voltage $V_{fw}$ output by the flywheel electric machine 351 into a DC voltage $V_{dc1}$. When the third voltage $V_6$ is lower than the reference voltage, the compensation control unit 354 further utilizes a control signal ctrl2 to control the rectifier 353, so that the rectifier 353 converts the DC voltage $V_{dc1}$ into an AC voltage $V_{ac1}$ for compensate the third voltage $V_6$. When the third voltage $V_6$ is higher than the reference voltage, the compensation control unit 354 utilizes the control signal ctrl2 to control the rectifier 353, so that the rectifier 353 converts a difference voltage $V_{acs}$ on the bus 334 into a DC voltage $V_{dcs}$, wherein the difference voltage $V_{acs}$ is a difference between the third voltage $V_6$ and the reference voltage. When the third voltage $V_6$ is higher than the reference voltage, the compensation control unit 354 further utilizes the control signal ctrl1 to control the rectifier 352, so that the rectifier 352 converts the DC voltage $V_{dcs}$ into an AC voltage $V_{fws}$, wherein the rectifier 352 puts the AC voltage $V_{fws}$ into the flywheel electric machine 351, and the flywheel electric machine 351 converts an electrical energy of the AC voltage $V_{fws}$ into a kinetic energy, so that the inertia-mass flywheel 3511 stores the kinetic energy being an energy of the kinetic-energy type. When one of a first condition and a second condition is satisfied, the system can more stably transmit the power. The first condition is that the wind power generation device 31 causes the third voltage $V_6$ to have a disturbance due to a wind speed variation. The second condition is that the wave power generation device 31 causes the third voltage $V_6$ to have a disturbance due to a wave variation.

Figure 4:
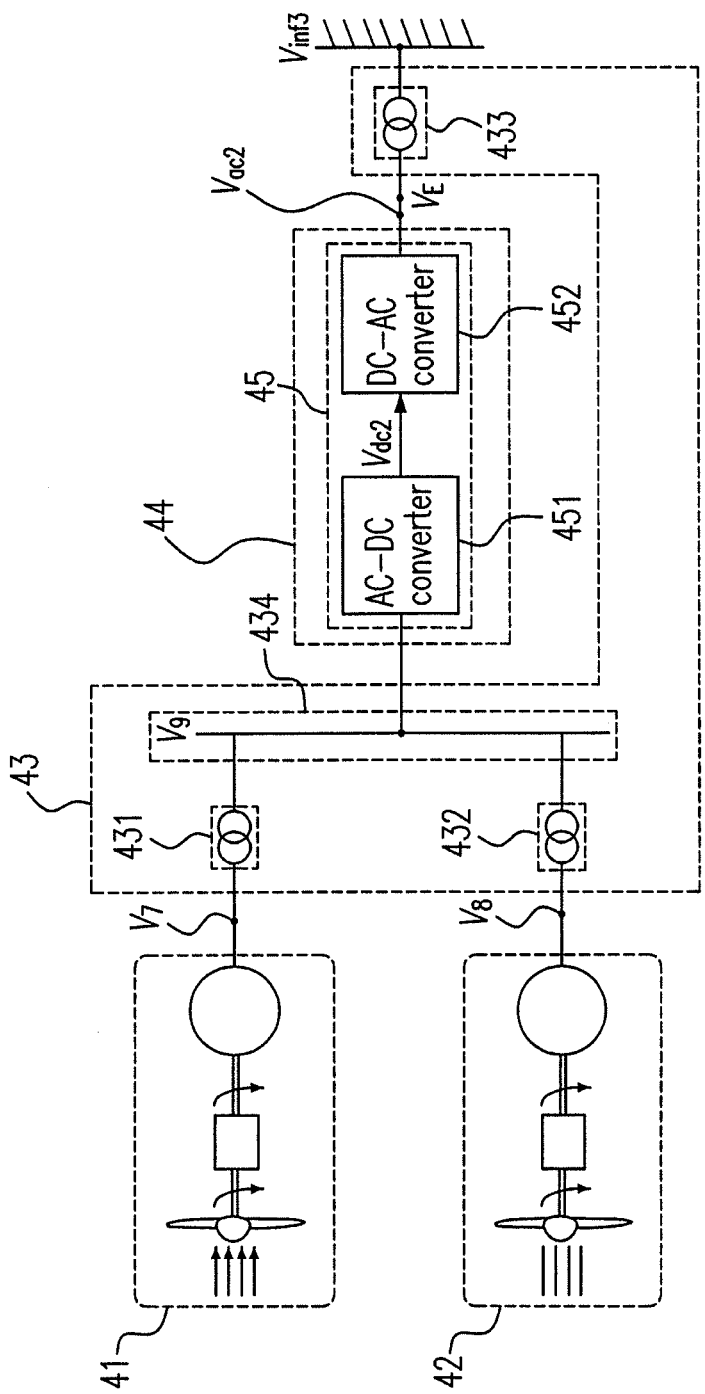
FIG. 4 is a schematic diagram showing a system for integrating a wind power generation with a wave power generation according to the third embodiment of the present invention.

Please refer to FIG. 4, which is a schematic diagram showing a system 40 for integrating a wind power generation with a wave power generation according to the third embodiment of the present invention. As shown, the system 40 for integrating the wind power generation with the wave power generation includes a wind power generation device 41, a wave power generation device 42 and a power integration device 43. The wind power generation device 41 generates a first voltage $V_7$. The wave power generation device 42 generates a second voltage $V_8$. The power integration device 43 integrates the first voltage $V_7$ with the second voltage $V_8$. For instance, the first voltage $V_7$ is integrated with the second voltage $V_8$ for a further use.

The power integration device 43 includes a first step-up device 431, a second step-up device 432, a third step-up device 433 and a bus 434. Each of the first step-up device 431 and the second step-up device 432 is connected to the bus 434. The first step-up device 431 boosts the first voltage $V_7$ up to a third voltage $V_9$. The second step-up device 432 boosts the second voltage $V_8$ up to the third voltage $V_9$. The system 40 further includes a voltage stabilizing system 44. The voltage stabilizing system 44 is connected to the third step-up device 433, controls the third voltage $V_9$ to derive a fourth voltage $V_E$ from the third voltage $V_9$, and stabilizes the third voltage $V_9$. The third step-up device 433 boosts the fourth voltage $V_E$ up to the voltage $V_{inf3}$.

The wind power generation device 41 and the wave power generation device 42 generate a power of 100 MW (mega Watts) and a power of 60 MW, respectively. The wind power generation device 41 and the wave power generation device 42 generate a first AC (alternating-current) voltage of 0.69 kV (kilo Volts) and a second AC voltage of 0.69 kV, respectively. The first step-up device 431 boosts the first AC voltage of 0.69 kV up to an AC voltage of 23 kV provided to the bus 434, and the second step-up device 432 boosts the second AC voltage of 0.69 kV up to the AC voltage of 23 kV. That is to say, a first power generated by the wind power generation device 41 and a second power generated by the wave power generation device 42 converge in the bus 434 to form a third power, wherein the first, the second and the third powers have the first, the second and the third voltages $V_7$, $V_8$, and $V_9$, respectively. The voltage stabilizing system 44 includes a high-voltage DC transmission system 45. The high-voltage DC transmission system 45 is connected to the third step-up device 433, and stabilizes the third voltage $V_9$ (i.e. the AC voltage of 23 kV). For instance, the high-voltage DC transmission system 45 adjusts the third power to stabilize the third voltage $V_9$. The third step-up device 433 boosts the AC voltage of 23 kV up to an AC voltage of 161 kV for providing the voltage $V_{inf3}$ of the commercial electric supply.

In FIG. 4, the high-voltage DC transmission system 45 stores an electric energy, and adjusts the electric energy to stabilize the third voltage $V_9$ in response to the third voltage $V_9$. The high-voltage DC transmission system 45 includes an AC-DC converter 451 and a DC-AC converter 452. The AC-DC converter 451 converts the third voltage $V_9$ into a DC voltage $V_{dc2}$, and the DC-AC converter 452 converts the DC voltage $V_{dc2}$ into an AC voltage $V_{ac2}$. When one of the third voltage $V_9$ and the AC voltage $V_{ac2}$ have a disturbance, the high-voltage DC transmission system 45 can rapidly make a compensation to one of the third voltage $V_9$ and the AC voltage $V_{ac2}$. For instance, the fourth voltage $V_E$ is equal to the AC voltage $V_{ac2}$.

In view of the systems 20, 30 and 40 in the first, the second and the third embodiments, each of the systems 20, 30 and 40 is an integrated power generation system. The integrated power generation system (such as 20) includes a first power generation device (such as 21), a second power generation device (such as 22) and a power-generation integration device (such as 23). The first power generation device has a first power generation type. For instance, the first power generation type is a wind power generation type. The second power generation device has a second power generation type different from the first power generation type. For instance, the second power generation type is a wave power generation type. The power-generation integration device integrates the first power generation device with the second power generation device. For instance, the power-generation integration device is a power integration device, and the first power generation device is integrated with the second power generation device for a further use.

In one embodiment, the first power generation device (such as 21) generates a first power having a first voltage (such as $V_1$). The second power generation device (such as 22) generates a second power having a second voltage (such as $V_2$). The power-generation integration device (such as 23) integrates the first power with the second power to form a third power having a third voltage (such as $V_3$). The power-generation integration device (such as 23) includes a first step-up device (such as 231), a second step-up device (such as 232), a third step-up device (such as 233) and a bus (such as 234). Each of the first step-up device (such as 231), the second step-up device (such as 232) and the third step-up device (such as 233) is coupled to the bus (such as 234). The first step-up device (such as 231) boosts the first voltage (such as $V_1$) up to a third voltage (such as $V_3$), and the second step-up device (such as 232) boosts the second voltage (such as $V_2$) up to the third voltage (such as $V_3$). For instance, the first power generation device (such as 21) is one of a wind power generation device (such as 21) and a wave power generation device (such as 22).

The integrated power generation system (such as 20) further includes a voltage stabilizing system (such as 24) having a control on the third voltage (such as $V_3$) to derive a fourth voltage (such as $V_A$). The third step-up device (such as 233) receives the fourth voltage (such as $V_A$) derived from the third voltage (such as $V_3$) under the control, and boosts the fourth voltage (such as $V_A$) up to a fifth voltage (such as $V_{inf1}$). The voltage stabilizing system (such as 24) is connected to the third step-up device (such as 233) and stabilizes a specific voltage, wherein the specific voltage is one of the third voltage (such as $V_3$) and the fifth voltage (such as $V_{inf1}$). The voltage stabilizing system (such as 24) includes one selected from a group consisting of a variable frequency transformer 25, a flywheel energy-storage system 35 and a high-voltage DC transmission system 45. For instance, the third power has a real power and a reactive power, and the voltage stabilizing system (such as 24) adjusts the reactive power to stabilize the specific voltage.

Figure 5:
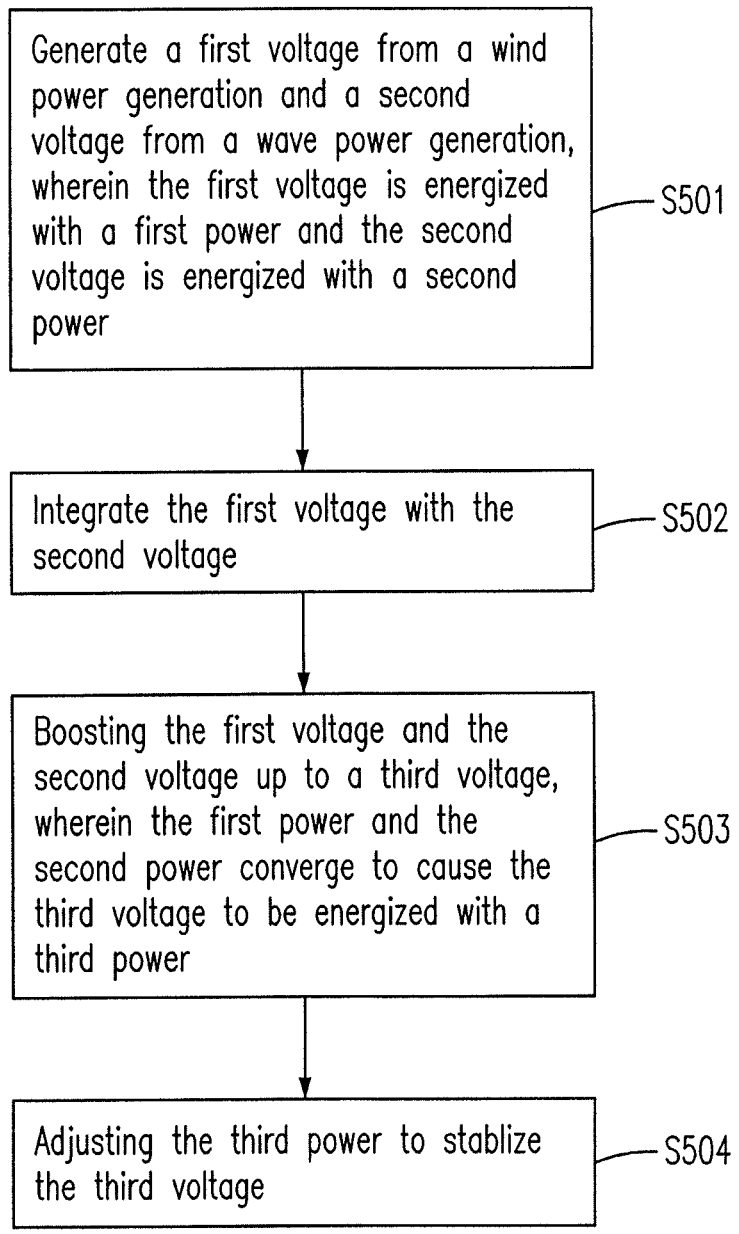
FIG. 5 is a schematic flow diagram showing a method for integrating a wind power generation with a wave power generation according to one embodiment of the present invention.

Please refer to FIG. 5, which is a schematic flow diagram showing a method 500 for integrating a wind power generation with a wave power generation according to one embodiment of the present invention. As shown in FIG. 5, in step S501, a first voltage from the wind power generation and a second voltage from the wave power generation are generated. For instance, the first voltage is energized with a first power, and the second voltage is energized with a second power. In step S502, the first voltage is integrated with the second voltage. In step S503, the first and the second voltages are boosted up to a third voltage, wherein the first power and the second power converge to cause the third voltage to be energized with a third power. In step 504, the third power is adjusted to stabilize the third voltage.

In the first, the second and the third embodiments, each of the systems 20, 30 and 40 includes a wind power generation device, a wave power generation device and a power integration device. The wave power generation device generates an electrical power by a Wells turbine. In one embodiment, alternatively, the wave power generation device can generates an electrical power by a double-side pipe permanent-magnet system.

Figure 6:
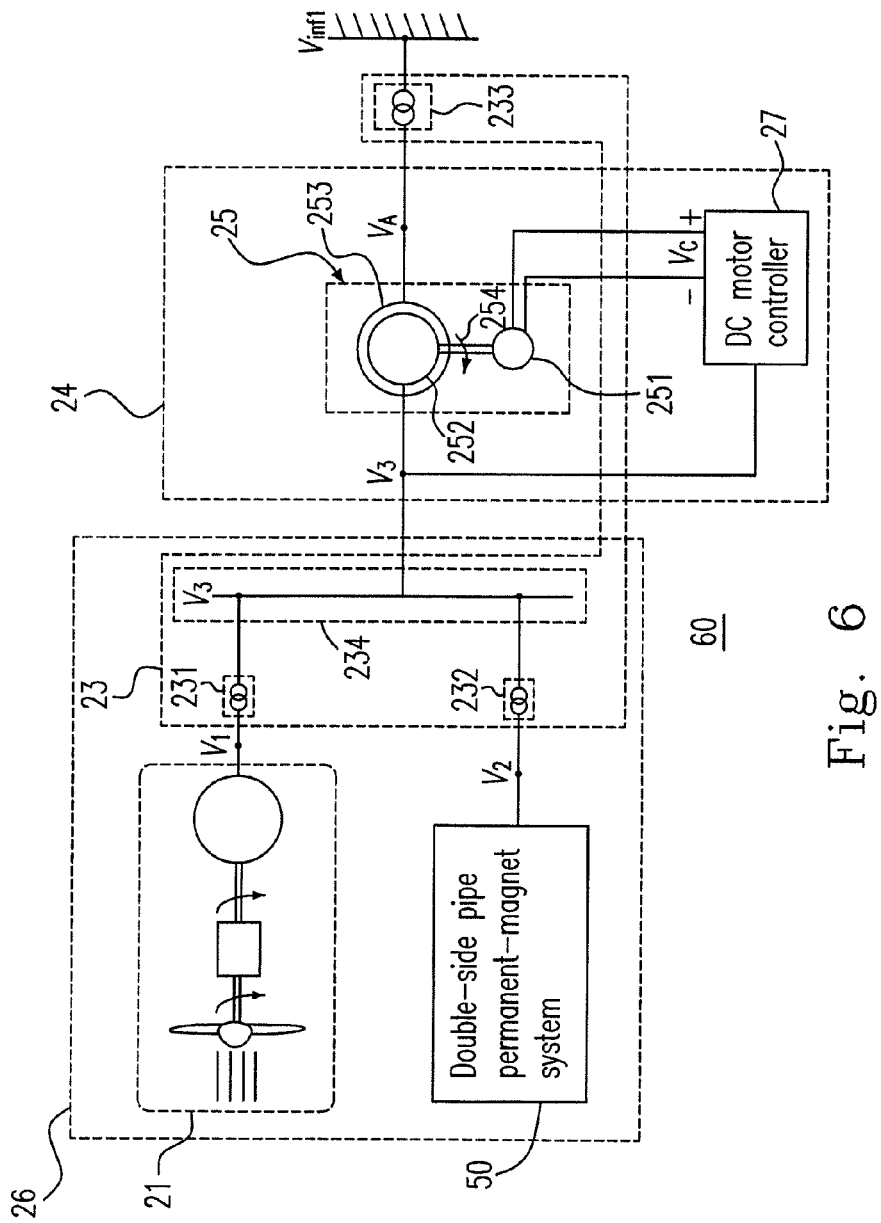
FIG. 6 is a schematic diagram showing a system for integrating a wind power generation with a wave power generation according to the fourth embodiment of the present invention.

Please refer to FIG. 6, which is a schematic diagram showing a system 60 for integrating a wind power generation with a wave power generation according to the fourth embodiment of the present invention. The system 60 for integrating the wind power generation with the wave power generation in FIG. 6 is similar to the system 20 in FIG. 2, wherein the wave power generation device 22 in FIG. 2 is replaced with a double-side pipe permanent-magnet system 50 to form the system 60, and the others of the system 20 in FIG. 2 are the same as those of the system 60 in FIG. 6.

Figure 7A:
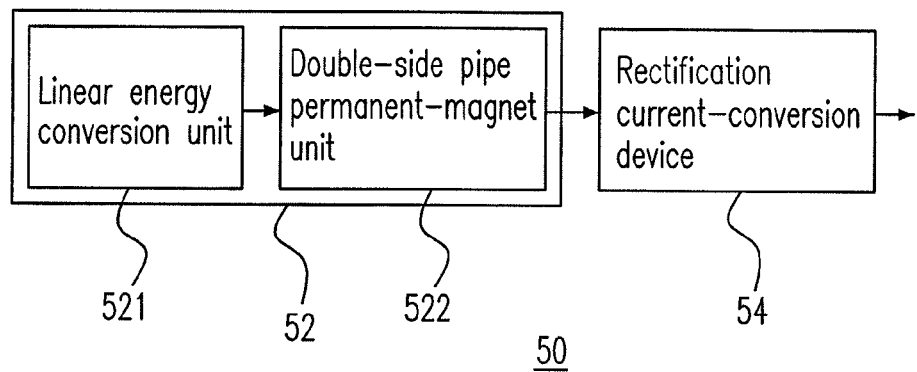
FIG. 7(a) is a schematic diagram showing a double-side pipe permanent-magnet system according to one embodiment of the present invention.

Please refer to FIG. 7(a), which is a schematic diagram showing a double-side pipe permanent-magnet system 50 according to one embodiment of the present invention. The double-side pipe permanent-magnet system 50 includes a double-side pipe permanent-magnet machine 52 and a rectification current-conversion device 54 coupled to the double-side pipe permanent-magnet machine 52. The rectification current-conversion device 54 may use the high-voltage DC transmission system 45 in FIG. 4 to perform a rectification and a current-conversion. The double-side pipe permanent-magnet machine 52 includes a linear energy conversion unit 521 and a double-side pipe permanent-magnet unit 522 coupled to the linear energy conversion unit 521.

Figure 7B:
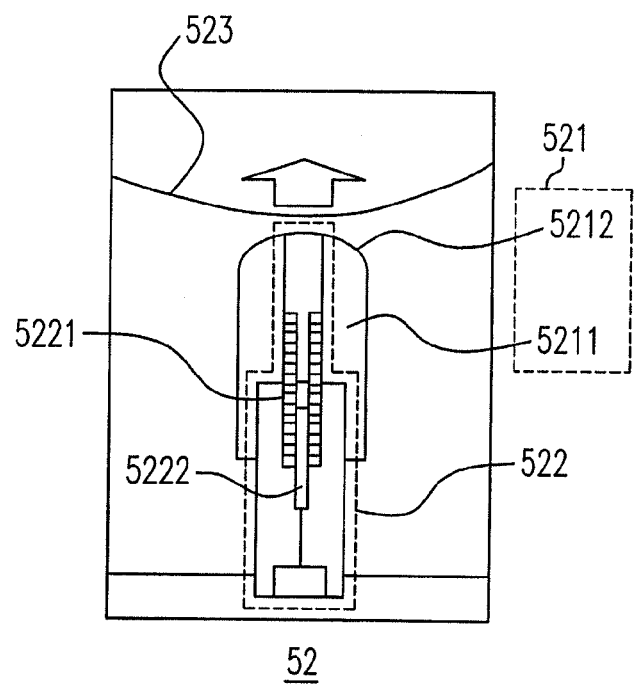
FIG. 7(b) and FIG. 7(c) are schematic diagrams showing internal structures of a double-side pipe permanent-magnet machine according to one embodiment of the present invention.
Figure 7C:
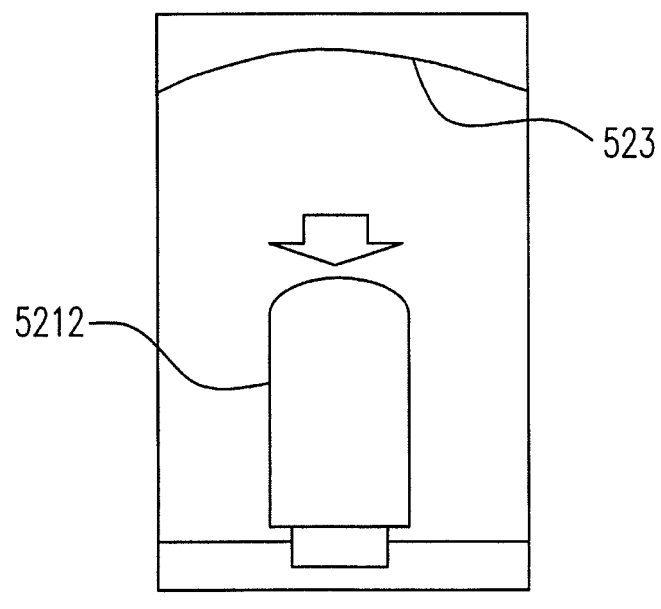

In FIG. 2, FIG. 3 and FIG. 4, under the condition that each of the wave power generation devices 22, 32 and 42 is the same as the double-side pipe permanent-magnet system 50, the internal structures of the double-side pipe permanent-magnet machine 52 are shown in FIG. 7(b) and FIG. 7(c).

In FIG. 7(b), the linear energy conversion unit 521 includes an air chamber 5211 and a floating cap 5212 coupled to the air chamber 5211. The double-side pipe permanent-magnet unit 522 includes a movable permanent-magnet array 5221 and a stator 5222 coupled to the movable permanent-magnet array 5221. The air chamber 5211 is filled with an air body. The wave 523 has an interface having a height in reference to the stator 5222. The floating cap 5212 coupled to the top portion of the air chamber 5211 can move up and down according to a sway of the interface of the wave 523. As shown in FIG. 7(b), when the height of the interface of the wave 523 decreases, the pressure on the floating cap 5212 decreases to cause the floating cap 5212 to move upward. As shown in FIG. 7(c), when the height of the interface of the wave 523 increases, the pressure on the floating cap 5212 increases to cause the floating cap 5212 to move downward. It can be seen that the wave 523 serves as a repeated straight force to act upon the linear energy conversion unit 521, and the repeated straight force has properties of relatively large force and relatively slow speed. For instance, a single unit of the double-side pipe permanent-magnet machine 52 generates an electrical power of about 250 kW.

There is a conventional method to absorb the wave energy. The conventional method converts a linear motion of the wave into a rotating motion by means of cranks, crankshafts or the like, and provides a gear box to raise the rotating speed of the rotating motion for driving the rotation-type generator. This method is cheaper and the operation principle thereof is easily realized. However, because the wave power generation device is disposed in the sea at a place separate from the shore, it is necessary for the wave power generation device to have the properties of robust and maintenance reduction. The conventional method is relatively less reliable due to the existence of the transmission medium of the intermediate machine, and will have the energy loss of the intermediate transmission. Therefore, the direct-driven linear generator capable of absorbing the wave energy becomes the only choice.

Figure 8:
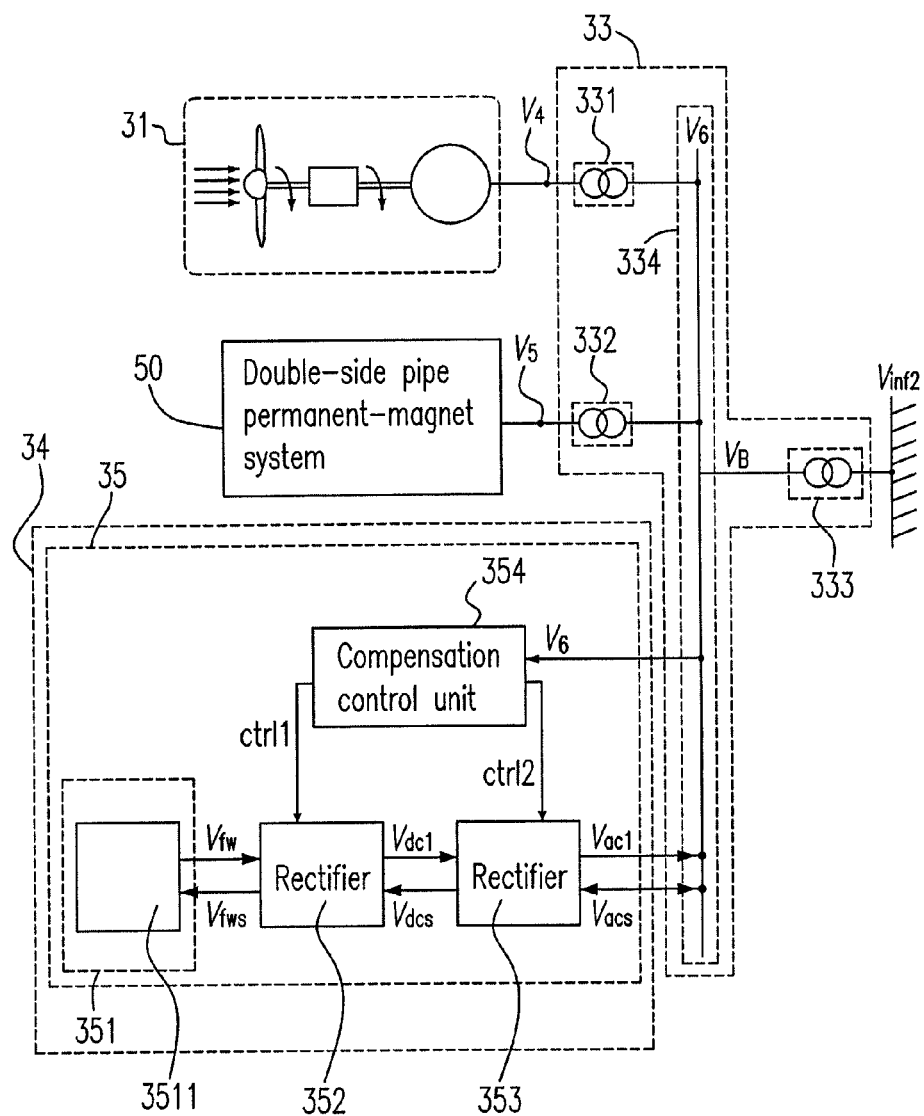
FIG. 8 is a schematic diagram showing a system for integrating a wind power generation with a wave power generation according to the fifth embodiment of the present invention.

Please refer to FIG. 8, which is a schematic diagram showing a system 70 for integrating a wind power generation with a wave power generation according to the fifth embodiment of the present invention. The system 70 for integrating the wind power generation with the wave power generation in FIG. 8 is similar to the system 30 in FIG. 3, wherein the wave power generation device 32 in FIG. 3 is replaced with a double-side pipe permanent-magnet system 50 to form the system 70, and the others of the system 30 in FIG. 3 are the same as those of the system 70 in FIG. 8.

Figure 9:
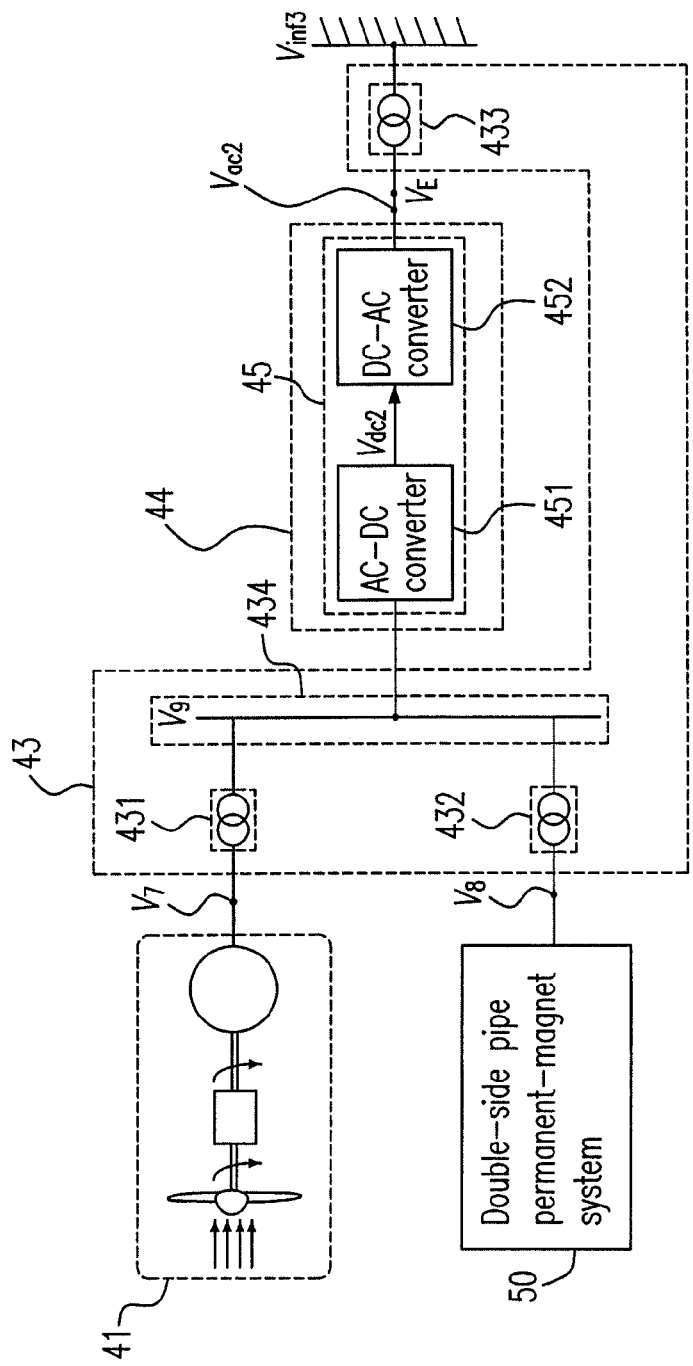
FIG. 9 is a schematic diagram showing a system for integrating a wind power generation with a wave power generation according to the sixth embodiment of the present invention.

Please refer to FIG. 9, which is a schematic diagram showing a system 80 for integrating a wind power generation with a wave power generation according to the sixth embodiment of the present invention. The system 80 for integrating the wind power generation with the wave power generation in FIG. 9 is similar to the system 40 in FIG. 4, wherein the wave power generation device 42 in FIG. 4 is replaced with a double-side pipe permanent-magnet system 50 to form the system 80, and the others of the system 40 in FIG. 4 are the same as those of the system 80 in FIG. 9.

For the first, the second and the third embodiments, each of the systems 20, 30 and 40 is configured to have the following conditions. For the wind power generation device, the wind-speed variation has a range of 4 m/s to 24 m/s. For wave power generation device 42, the wave causes the air-speed variation of the Wells turbine has a range of 2 m/s to 7 m/s. When the third voltage $V_3$ on the bus 234 has a disturbance due to a first condition, the variable frequency transformer 25 in the first embodiment will suitably adjust the torque 254 output by the DC motor 251 to stabilize the third voltage $V_3$, wherein the first condition is one of the wind-speed change about the wind power generation device 21 and the air-speed change of the Wells turbine about the wave power generation device 22. When the third voltage $V_6$ on the bus 334 has a disturbance due to a second condition, the flywheel energy-storage system 35 in the second embodiment will cause the power to be transmitted more smoothly by means of the properties of the energy storage and the energy release thereof, wherein the second condition is one of the wind-speed change about the wind power generation device 31 and the air-speed change of the Wells turbine about the wave power generation device 32. When the third voltage $V_9$ on the bus 434 has a disturbance due to a third condition, the high-voltage DC transmission system 45 in the third embodiment will control the third voltage $V_9$ on the bus 434 to stabilize the power transmission, wherein the third condition is one of the wind-speed change about the wind power generation device 41 and the air-speed change of the Wells turbine about the wave power generation device 42. When any of the voltages $V_{inf1}$, $V_{inf2}$ and $V_{inf3}$ of the commercial electric supply has a condition of a three-phase short circuit, extremely high oscillation amplitude will be generated. Each of the abovementioned voltage stabilizing system 24, 34 and 44 can improve the oscillation amplitude.

Please refer to Table 1. The simulated data in Table 1 shows the stability conditions employing the variable frequency transformer 25 to stabilize the third voltage $V_3$ in the modes of the wind power generation device 21, the wave power generation device 22, the power integration device 23 and the variable frequency transformer 25 when the air speed is fixed to be 6 m/s and the wind speed is sequentially varied to be 4 m/s, 6 m/s, 8 m/s, 10 m/s, 12 m/s and 14 m/s.

TABLE 1

| Mode | Wind speed | | | | | |
|---|---|---|---|---|---|---|
| | 4 m/s | 6 m/s | 8 m/s | 10 m/s | 12 m/s | 14 m/s |
| Device 21 | −19.1309 ± j375.7736 | −19.1117 ± j375.7732 | −19.0892 ± j375.7658 | −19.0676 ± j375.7439 | −19.0422 ± j375.7004 | −18.9488 ± j375.6432 |
| Device 22 | −71.0592 ± j20.2236 | −70.8739 ± j20.3469 | −70.4261 ± j20.3811 | −69.6871 ± j19.7903 | −69.4927 ± j18.6451 | −69.9729 ± j18.3585 |
| Device 23 | −2.4119 ± j4.3833 | −2.5626 ± j4.4122 | −2.7997 ± j4.4084 | −3.3236 ± j4.2824 | −4.8309 ± j4.7361 | −5.7529 ± j6.0537 |
| Transformer 25 | −14.111 ± j2.2084 | −14.2538 ± j2.0639 | −14.4412 ± j1.7256 | −14.5005 ± j0.9428 | −12.7496 ± j0.6284 | −11.9785 ± j1.1646 |

In Table 1, eigenvalues represent the stabilities and the modes for stabilizing the third voltage $V_3$. Each of the eigenvalues is expressed in a respective complex number. The larger the negative number of the real part of the respective complex number, the faster the voltage to recover to be stable. The imaginary part of the respective complex number represents the oscillation frequency of the third voltage $V_3$. The stability conditions for stabilizing the third voltage $V_3$ on the wind power generation device 21, the wave power generation device 22, the power integration device 23 and the variable frequency transformer 25 can be seen from the listed modes. The simulated data in Table 2 shows the stability conditions employing the flywheel energy-storage system 35 to stabilize the third voltage $V_6$ in the modes of the wind power generation device 31, the wave power generation device 32, the power integration device 33 and the flywheel energy-storage system 35 when the air speed is fixed to be 6 m/s and the wind speed is sequentially varied to be 4 m/s, 6 m/s, 8 m/s, 10 m/s, 12 m/s and 14 m/s.

In Table 2, eigenvalues similar to those in Table 1 represent the stability in the modes for stabilizing the third voltage $V_6$. Each of the eigenvalues is expressed in a respective complex number. The larger the negative number of the real part of the respective complex number, the faster the voltage to recover to be stable. The imaginary part of the respective complex number represents the oscillation frequency of the third voltage $V_6$. The stability conditions for stabilizing the third voltage $V_6$ on the wind power generation device 31, the wave power generation device 32, the power integration device 33 and the flywheel energy-storage system 35 can be seen from the listed modes. The simulated data in Table 3 shows the stability conditions employing the high-voltage DC transmission system 45 to stabilize the third voltage $V_9$ in the modes of the wind power generation device 41, the wave power generation device 42, the power integration device 43 and the high-voltage DC transmission system 45 when the air speed is fixed to be 6 m/s and the wind speed is sequentially varied to be 4 m/s, 6 m/s, 8 m/s, 10 m/s, 12 m/s and 14 m/s.

TABLE 2

| Mode | Wind speed | | | | | |
|---|---|---|---|---|---|---|
| | 4 m/s | 6 m/s | 8 m/s | 10 m/s | 12 m/s | 14 m/s |
| Device 31 | −21.8326 ± j374.8322 | −21.8326 ± j374.8322 | −21.8326 ± j374.8322 | −21.8326 ± j374.8322 | −21.8326 ± j374.8322 | −21.8326 ± j374.8322 |
| Device 32 | −40.5764 ± j378.6502 | −40.5764 ± j378.6502 | −40.5764 ± j378.6502 | −40.5764 ± j378.6502 | −40.5764 ± j378.6502 | −40.5764 ± j378.6502 |
| Device 33 | −5.2795 ± j5.2866 | −5.2795 ± j5.2866 | −5.2795 ± j5.2866 | −5.2795 ± j5.2866 | −5.2795 ± j5.2866 | −5.2795 ± j5.2866 |
| System 35 | −14.6551 ± j1.5551 | −14.6551 ± j1.5551 | −14.6551 ± j1.5551 | −14.6551 ± j1.5551 | −14.6551 ± j1.5551 | −14.6551 ± j1.5551 |

TABLE 3

| Mode | Wind speed | | | | | |
|---|---|---|---|---|---|---|
| | 4 m/s | 6 m/s | 8 m/s | 10 m/s | 12 m/s | 14 m/s |
| Device 41 | −5.6705 ± j371.5691 | −5.6705 ± j371.5691 | −5.6705 ± j371.5691 | −5.6705 ± j371.5691 | −5.6705 ± j371.5691 | −5.6705 ± j371.5691 |
| Device 42 | −18.8829 ± j376.146 | −18.8829 ± j376.146 | −18.8829 ± j376.146 | −18.8829 ± j376.146 | −18.8829 ± j376.146 | −18.8829 ± j376.146 |
| Device 43 | −4.6541 ± j29.3091 | −4.6542 ± j29.3095 | −4.6545 ± j29.3093 | −4.6544 ± j29.3095 | −4.6546 ± j29.3092 | −4.6548 ± j29.3095 |
| System 45 | −68.2825 ± j611.995 | −68.2825 ± j611.995 | −68.2825 ± j611.995 | −68.2825 ± j611.995 | −68.2825 ± j611.995 | −68.2825 ± j611.995 |

It can be seen from Tables 1, 2 and 3 that the stability in the mode of the high-voltage DC transmission system 45 for stabilizing the third voltage $V_9$ is the best.

For the systems 20, 30 and 40 in the first, the second and the third embodiments, any of the voltage stabilizing systems 24, 34 and 44 can further include a respective PID (proportional-integral-derivative) controller to improve the damping effect of the corresponding system. When the torque of any of the wind power generation devices 21, 31 and 41 has a disturbance, the corresponding PID controller can control the corresponding third voltage to be more stable for more stably transmitting a power.

Embodiments:

1. A system for integrating a wind power generation with a wave power generation includes a wind power generation device, a wave power generation device and a power integration device. The wind power generation device generates a first voltage. The wave power generation device generates a second voltage. The power integration device integrates the first voltage with the second voltage.

2. The system of embodiment 1 wherein the first voltage is integrated with the second voltage for a further use; the power integration device includes a first step-up device, a second step-up device, a third step-up device and a bus; each of the first step-up device and the second step-up device is connected to the bus; and the first step-up device boosts the first voltage up to a third voltage, and the second step-up device boosts the second voltage up to the third voltage.

3. The system of embodiments 1-2 further includes a voltage stabilizing system; and the voltage stabilizing system is connected to the third step-up device, controls the third voltage to derive a fourth voltage from the third voltage, stabilizes the third voltage, and includes one selected from a group consisting of a variable frequency transformer, a flywheel energy-storage system and a high-voltage DC transmission system.

4. The system of embodiments 1-3 wherein when the voltage stabilizing system includes the variable frequency transformer, the variable frequency transformer generates the fourth voltage, and includes a DC motor, a rotor and a stator. The DC motor generates a torque applied to the rotor, and adjusts the torque to stabilize the third voltage in response to the third voltage.

5. The system of embodiments 1-4 wherein the third voltage is equal to the fourth voltage, and when the voltage stabilizing system includes the flywheel energy-storage system, the flywheel energy-storage system stores a kinetic energy, and adjusts the kinetic energy to stabilize the third voltage in response to the third voltage.

6. The system of embodiments 1-5 wherein when the voltage stabilizing system includes the high-voltage DC transmission system, the high-voltage DC transmission system generates the fourth voltage, stores an electric energy, and adjusts the electric energy to stabilize the third voltage in response to the third voltage.

7. The system of embodiments 1-6 wherein the third step-up device boosts the fourth voltage up to a fifth voltage.

8. The system of embodiments 1-7 wherein the wind power generation device includes a doubly-fed induction generator; and the wave power generation device includes one selected from a group consisting of a squirrel cage rotor induction generator, a Wells turbine and a double-side pipe permanent-magnet system.

9. A method for integrating a wind power generation with a wave power generation includes steps of: generating a first voltage from the wind power generation and a second voltage from the wave power generation; and integrating the first voltage with the second voltage.

10. The method of embodiment 9 wherein the first voltage is energized with a first power; the second voltage is energized with a second power; and the method further comprises steps of: boosting the first and the second voltages up to a third voltage, wherein the first power and the second power converge to cause the third voltage to be energized with a third power; and adjusting the third power to stabilize the third voltage.

11. The method of embodiment 9-10 further includes steps of: providing a variable frequency transformer, wherein the variable frequency transformer receives the third voltage and includes a rotor receiving a torque and a stator coupled to the rotor; and adjusting the torque in response to the third voltage for stabilizing the third voltage.

12. The method of embodiment 9-11 further includes steps of: storing a kinetic energy; and adjusting the kinetic energy in response to the third voltage for stabilizing the third voltage.

13. The method of embodiment 9-12 further includes steps of: storing an electric energy; and adjusting the electric energy in response to the third voltage for stabilizing the third voltage.

14. The method of embodiment 9-13 further includes steps of: deriving a fourth voltage from the third voltage under a control for stabilizing the third voltage; and boosting the fourth voltage up to a fifth voltage.

15. An integrated power generation system includes a first power generation device, a second power generation device and a power-generation integration device. The first power generation device has a first power generation type. The second power generation device has a second power generation type different from the first power generation type. The power-generation integration device integrates the first power generation device with the second power generation device.

16. The integrated power generation system of embodiment 15 wherein the first power generation device is integrated with the second power generation device for a further use; the first power generation device generates a first power having a first voltage; the second power generation device generates a second power having a second voltage; and the power-generation integration device integrates the first power with the second power to form a third power having a third voltage.

17. The integrated power generation system of embodiment 15-16 wherein the power-generation integration device includes a first step-up device, a second step-up device, a third step-up device and a bus; each of the first step-up device, the second step-up device and the third step-up device is coupled to the bus; the first step-up device boosts the first voltage up to the third voltage, and the second step-up device boosts the second voltage up to the third voltage; the first power generation device is one of a wind power generation device and a wave power generation device; the integrated power generation system further includes a voltage stabilizing system having a control on the third voltage to derive a fourth voltage; the third step-up device receives the fourth voltage derived from the third voltage under the control, and boosts the fourth voltage up to a fifth voltage; the voltage stabilizing system is connected to the third step-up device and stabilizes a specific voltage, wherein the specific voltage is one of the third and the fifth voltages; and the voltage stabilizing system includes one selected from a group consisting of a variable frequency transformer, a flywheel energy-storage system and a high-voltage DC transmission system.

18. The integrated power generation system of embodiment 15-17 wherein when the voltage stabilizing system includes the variable frequency transformer, the variable frequency transformer generates the fourth voltage, and includes a DC motor, a rotor and a stator; and the DC motor generates a torque applied to the rotor, and adjusts the torque to stabilize the specific voltage in response to the third voltage.

19. The integrated power generation system of embodiment 15-18 wherein the third voltage is equal to the fourth voltage, and when the voltage stabilizing system includes the flywheel energy-storage system, the flywheel energy-storage system stores a kinetic energy, and adjusts the kinetic energy to stabilize the specific voltage in response to the third voltage.

20. The integrated power generation system of embodiment 15-19 wherein when the voltage stabilizing system includes the high-voltage DC transmission system, the high-voltage DC transmission system generates the fourth voltage, stores an electric energy, and adjusts the electric energy to stabilize the specific voltage in response to the third voltage.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A system for integrating a wind power generation with a wave power generation, comprising:
   a wind power generation device generating a first voltage;
   a wave power generation device generating a second voltage; and
   a power integration device including a bus, integrating the first voltage with the second voltage, and boosting each of the first and the second voltages up to a third voltage on the bus; and
   a voltage stabilizing system including a rotor having a rotating direction, a stator coupled to the rotor, and a DC motor generating a torque to be applied to the rotor, wherein:
   the torque is generated to stabilize the third voltage, and has a torque direction;
   when the third voltage is increased, the voltage stabilizing system causes the torque direction to be opposite to the rotating direction in response to the third voltage; and
   when the third voltage is decreased, the voltage stabilizing system causes the torque direction to be the same as the rotating direction in response to the third voltage.

2. A system according to claim 1, wherein:
   the first voltage is integrated with the second voltage for a further use;
   the power integration device further includes a first step-up device, a second step-up device, and a third step-up device;
   each of the first step-up device and the second step-up device is connected to the bus; and
   the first step-up device boosts the first voltage up to the third voltage, and the second step-up device boosts the second voltage up to the third voltage.

3. A system according to claim 2, wherein:
   the voltage stabilizing system is connected to the third step-up device, controls the third voltage to derive a fourth voltage from the third voltage, stabilizes the third voltage, and includes a variable frequency transformer.

4. A system according to claim 3, wherein:
   the torque further has a size;
   the variable frequency transformer generates the fourth voltage, and includes the DC motor, the rotor and the stator; and
   the DC motor adjusts the torque to stabilize the third voltage in response to the third voltage.

5. A system according to claim 3, wherein the third step-up device boosts the fourth voltage up to a fifth voltage.

6. A system according to claim 1, wherein:
   the wind power generation device includes a doubly-fed induction generator; and
   the wave power generation device includes one selected from a group consisting of a squirrel cage rotor induction generator, a Wells turbine and a double-side pipe permanent-magnet system.

7. A method for integrating a wind power generation with a wave power generation, comprising steps of:
   providing a bus;
   providing a high-voltage direct-current (DC) transmission system storing an electric energy;
   generating a first alternating-current (AC) voltage from the wind power generation and a second AC voltage from the wave power generation;
   integrating the first AC voltage with the second AC voltage;
   boosting each of the first and the second AC voltages up to a third AC voltage on the bus;
   causing the high-voltage DC transmission system for a first conversion converting the third AC voltage into a DC voltage;
   causing the high-voltage DC transmission system for a second conversion converting the DC voltage into a fourth AC voltage to provide a commercial electric supply voltage; and
   when the third AC voltage has a voltage variation, adjusting the electric energy through the first and the second conversions to stabilize the third AC voltage.

8. A method according to claim 7, wherein:
   the first AC voltage is energized with a first power;
   the second AC voltage is energized with a second power, wherein the first power and the second power converge to cause the third AC voltage to be energized with a third power; and
   the method further comprises a step of:
   adjusting the third power to stabilize the third voltage.

9. A method according to claim 8, further comprising steps of:
   controlling a stability of the third voltage;
   deriving a fourth voltage from the third voltage when the third voltage is stabilized; and
   boosting the fourth AC voltage up to a fifth AC voltage being the commercial electric supply voltage.

10. An integrated power generation system, comprising:
    a first power generation device having a first power generation type, and generating a first voltage;
    a second power generation device having a second power generation type different from the first power generation type, and generating a second voltage;
    a power-generation integration device including a bus, integrating the first power generation device with the second power generation device, and boosting both the first and the second voltages up to a third voltage on the bus; and
    a voltage stabilizing system storing a kinetic energy to stabilize the third voltage, wherein:
    when the third voltage is higher than a reference voltage, the voltage stabilizing system generates a first electrical energy from a difference voltage between the third voltage and the reference voltage, and adjusts the kinetic energy by combining the kinetic energy with the first electrical energy; and when the third voltage is lower than the reference voltage, the voltage stabilizing system generates a second electrical energy from the kinetic energy, and provides the second electrical energy to the bus.

11. An integrated power generation system according to claim 10, wherein:

the first power generation device is integrated with the second power generation device for a further use;

the first power generation device generates a first power having the first voltage;

the second power generation device generates a second power having the second voltage; and the power-generation integration device integrates the first power with the second power to form a third power having the third voltage.

12. An integrated power generation system according to claim 11, wherein:

the power-generation integration device further includes a first step-up device, a second step-up device, and a third step-up device;

each of the first step-up device, the second step-up device and the third step-up device is coupled to the bus;

the first step-up device boosts the first voltage up to the third voltage, and the second step-up device boosts the second voltage up to the third voltage;

the first power generation device is one of a wind power generation device and a wave power generation device;

the voltage stabilizing system has a control on the third voltage to derive a fourth voltage;

the third step-up device receives the fourth voltage derived from the third voltage under the control, and boosts the fourth voltage up to a fifth voltage;

the voltage stabilizing system is connected to the third step-up device and stabilizes the third voltage; and the voltage stabilizing system includes a flywheel energy-storage system.

13. An integrated power generation system according to claim 12, wherein the third voltage is equal to the fourth voltage, and the flywheel energy-storage system stores the kinetic energy, and adjusts the kinetic energy to stabilize the third voltage.

* * * * *